United States Patent
Górski

(10) Patent No.: US 11,411,896 B2
(45) Date of Patent: Aug. 9, 2022

(54) SYSTEM AND METHOD ENABLING REAL-TIME COMMUNICATION RATING BY PREDEFINED CONDITIONS CONNECTED WITH RATING SUMMARY AGENT APPLICATION DISPLAY AND THE AUTOMATED SENDING SYSTEM

(71) Applicant: Krzysztof Górski, Wroclaw (PL)

(72) Inventor: Krzysztof Górski, Wroclaw (PL)

(73) Assignee: LIVECHAT SOFTWARE SA, Wroclaw (PL)

( * ) Notice: Subject to any disclaimer, the term of this patent is extended or adjusted under 35 U.S.C. 154(b) by 11 days.

(21) Appl. No.: 16/699,227

(22) Filed: Nov. 29, 2019

(65) Prior Publication Data

US 2021/0168099 A1 Jun. 3, 2021

(51) Int. Cl.
| | |
|---|---|
| *G06F 15/16* | (2006.01) |
| *H04L 51/04* | (2022.01) |
| *G06Q 10/10* | (2012.01) |
| *G06F 16/958* | (2019.01) |
| *H04L 67/02* | (2022.01) |
| *H04L 51/00* | (2022.01) |

(52) U.S. Cl.
CPC ............ *H04L 51/04* (2013.01); *G06F 16/972* (2019.01); *G06Q 10/107* (2013.01); *H04L 51/16* (2013.01); *H04L 67/02* (2013.01)

(58) Field of Classification Search
CPC ..... G06Q 10/107; G06F 16/972; H04L 67/02; H04L 51/04; H04L 51/16
See application file for complete search history.

(56) References Cited

U.S. PATENT DOCUMENTS

| | | | | |
|---|---|---|---|---|
| 10,037,491 | B1 * | 7/2018 | Fang | G06F 40/30 |
| 10,382,629 | B2 * | 8/2019 | McCoy | H04M 3/5235 |
| 10,853,375 | B1 * | 12/2020 | Alyea | G06F 16/24578 |
| 10,990,760 | B1 * | 4/2021 | Monnett | G06F 40/151 |
| 2019/0312827 | A1 * | 10/2019 | Barve | H04L 51/02 |
| 2020/0125250 | A1 * | 4/2020 | Viswanath | G06Q 30/0601 |

* cited by examiner

*Primary Examiner* — Yves Dalencourt
(74) *Attorney, Agent, or Firm* — Jacob Eisenberg

(57) ABSTRACT

A system and method for real-time polling and rating by a chat end-user (also called visitor) of chat satisfaction based upon predefined scorings displayed in the user interface and then processed to receive analyzed data of satisfaction score displayed in the agent application is disclosed. The scores presented in the dashboard are connected with the automated sending process where the main account administrator may receive digital reports via email.

15 Claims, 6 Drawing Sheets

SYSTEM AND METHOD ENABLING REAL-TIME COMMUNICATION RATING BY PREDEFINED CONDITIONS CONNECTED WITH RATING SUMMARY AGENT APPLICATION DISPLAY AND THE AUTOMATED SENDING SYSTEM

BACKGROUND OF THE INVENTION

The present disclosure is related to the field of real-time messaging implemented within any chat or instant messaging solution. More particularly, the present disclosure relates to techniques for determining sentiments associated with conversations, including a system and method for enabling data gathering and processing based on redefined qualifiers amounting to present chat satisfaction ratings. It is directly connected with the pooling system which enables chat satisfaction assessment via predefined statuses. The system collects data from User Interfaces (UI) and transfers it to a mechanism which classifies data to meet the requirements of scoring and present it in a way designed to show chat efficiency to and of a chat agent.

The present disclosure addresses a need for simple chat satisfaction measures to assess agent effectiveness. Certain embodiments of the present disclosure make use of backend architecture to calculate chat scoring, and data used to perform such assessment originates from frontend user-facing infrastructure displaying predefined buttons allowing and/or facilitating the marking of a satisfaction level. In addition, the present disclosure addresses every-day needs of companies using chat-based methods of customer service to assess agents' performance. It is designed to combine easy and accessible user interface with the method of data collection and display joined with automated sending process. Certain embodiments of the present disclosure implement a Wilson Score algorithm, a known formula that is widely used in different technological branches whose application to the scoring system of agent performance constitutes an innovative usage of this scoring.

The embodiments herein constitute an innovative method and system connecting end-user chat rating with report system and automated report sending which is different from other known solutions.

United States patent application US 2018/0165582, filed on Jun. 14, 2018, is directed to organizing and presenting in a user interface clicks responsible for conversation satisfaction level which focuses on sentiment scoring on social media.

United States patent application US 2017/0171118 A1, filed Jun. 15, 2017 focuses on social media semantic scoring conducted between anonymous end-users what differs from the embodiment claimed which amounts to present certain user data to the agent.

United States patent application US 2015/0356468 A1, published on Dec. 10, 2015, is not made to create a channel of communication between two chat end users but to create a way to gather ratings for chat agents in the panel and display predefined reports. At the time of the present embodiments, there were different rating collection methods, none of which enabled comprehensive data interpretation and presentation combined with automated reports sending.

BRIEF SUMMARY OF THE INVENTION

In view of the limitations in the related art, an object of certain embodiments of the disclosure may be to address the need of having measurable metrics concerning chat agent performance available for external end-user assessment. Furthermore, the present system and method create a comprehensive data collection for data display and reports sending features that may be implemented in any real-time messaging system allowing and/or enabling agent and end-user communication. This system and method shall be efficient for both instant web messaging systems such as chat solutions and for mobile devices configured to enable agent and end-user communication. The present embodiments are composed of three main elements, namely: (1) predefined rating features inserted into the chat window with predefined pooling scores displayed in a graphical form; (2) a mechanism which gathers data collected from the chat window with implemented scoring system and displays it according to Wilson score evaluation in the application; and (3) automated report generation and sending which summarizes data gathered by the system and delivers it via email and the like.

Other aspects and advantages of the present disclosure will become apparent from the following detailed description of the embodiments and the accompanying drawing figures. Unless otherwise defined, all technical, as well as scientific terms used herein, have the same meaning as commonly understood by one of ordinary skill in the art to which the invention pertains. All terms related to specific aspects of embodiments set out herein being out of the regular scope of commonly used language from the field of the invention shall be followed by an explanation. Implementation of embodiments, namely, method and system of the invention, can involve performing or completing selected tasks manually, automatically, or a combination thereof. The embodiments constitute an additional element that shall be complementary with numerous real-time messaging systems as chat communicators and its implementation require API access. Moreover, according to actual instrumentation and equipment of embodiments of the method and system of the invention, several selected tasks could be implemented by software or may affect a code implementation on an Internet intermediary page or application where the embodiments shall be used.

BRIEF DESCRIPTION OF THE SEVERAL VIEWS OF THE DRAWINGS

Further advantages, features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

In the following, advantageous examples of the invention are explained with reference to the accompanying figures, wherein.

DETAILED DESCRIPTION OF THE INVENTION

Figure 1:
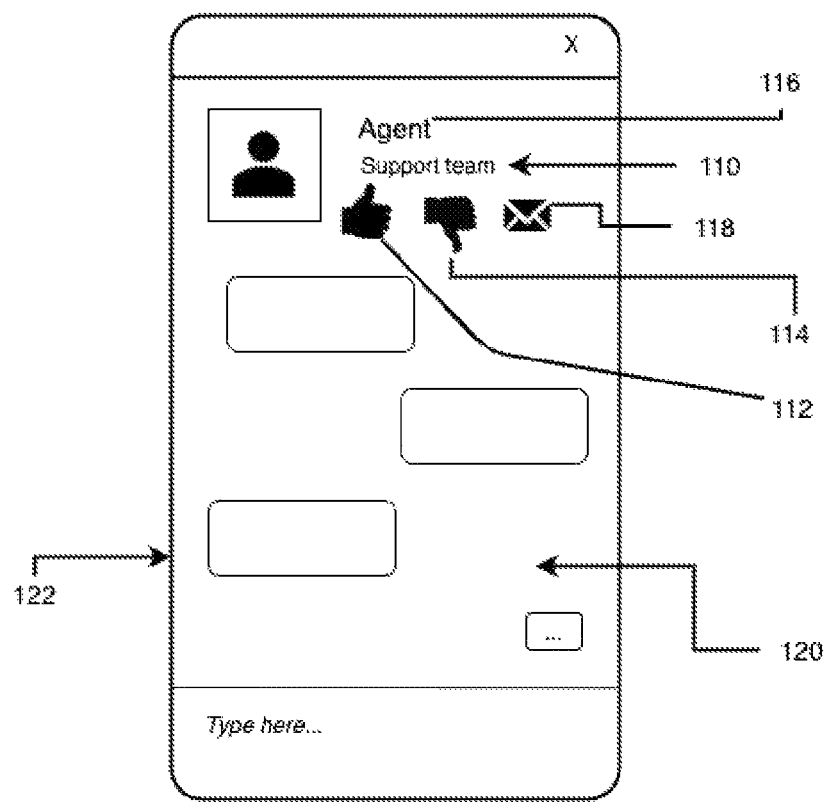
FIG. 1 depicts an apparatus for rating collection from an end-user, the apparatus including user rating parameters implemented in a chat window.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

The present disclosure is directed to a system and method for determining chat ratings combined with a reporting system embedded into chat or other real-time messaging solutions. The term "chat" as used herein refers to any real-time messaging implemented online into a webpage, application, platform or any other means of online data exchange and communication, both in mobile and browser versions, used on portable mobile devices, personal computers or laptops. The term "rating" as used herein addresses an assessment scale enabled by the instant system and method arising out of the calculation, storage, and display of particular rating results. The term "agent" as used herein refers to a person(s) responsible for such real-time messaging communication management from the side of the company delivering product or service to the user. The term "chat end user" or "end user" or "user" as used herein shall be understood as a webpage, application or any other online platform visitor using chat as a means of communication in order to ask questions, make comments, refer to particular offers and/or other features of a agent represented company presented on the webpage and/or generally communicate with the web page owner for any other reason.

Currently, usage of instant messaging constitutes a core element of customer service and support. It remains especially important for businesses using online communications, via webpage or application and accordingly the present embodiments can be implemented with any and all of online forums. Furthermore, present embodiments address issues of growing importance arising out of an ever-increasing number of people using online means of data exchange as well as making and/or using purchase platforms or other internet-based sources. This growth creates a space and a challenge for customer service which is right now often managed in the form of real-time textual conversion.

The present embodiments enable easy and accessible chat ratings with the capability of vote correction and/or voting again. Predefined options of the vote (FIG. 1, element 110) make it easier for the end-user to express an opinion and as a consequence, for a chat administrator to receive generic feedback about its agents. Customer service provided in the form of a chat run by agents may be utilized in a variety of devices (mobile applications, webpages operated through browsers, online applications). In all of the aforementioned, it is possible to embed a real-time messaging system.

As depicted in FIG. 1, The system and method according to embodiments of the present invention include an element implemented into the chat system thereby allowing it to collect simplified user feedback and present it in the form of variable statistics to service agent and chat account administrator. Furthermore, the present embodiments enable the user to see the overall statistics of agents' performances for a defined time period as well as a sending of such reports via email according to a predefined timeline. This system and method may communicate and otherwise cooperate with any chosen form of instant communication using a typical conversation or chat window or user interface 120 where it is possible to display a rating metrics 110 for the user to click or otherwise activate. Known examples of such rating metrics may include the common widget in the form of a thumbs up 112 and thumbs down 114, conveniently presented within the conversation or chat window of easy user access and activation. Additional elements displayable to the user may include an agent identifier 116 as well as an e-mail element 118, such display and supporting functionality thereof being executed by means known to the skilled person. While the depicted form of instant communication comprises the ubiquitous smart phone 122, the present embodiments may be implemented into and/or with other known forms of instant communication.

The initial process of chat ratings from the perspective of the end-user starts from within a chat window. This present method and system is directed to the implementation of simple satisfaction—scoring, namely, positive or negative. The graphical representation depicted in FIG. 1 is presented by way of example only, with the understanding that other graphical representations may be implemented by the skilled person without departing from the spirit of the present invention. The present embodiments enable implementation of any graphic signs representing a satisfaction score. Consequently, the embodiments assume two metrics, namely satisfied and unsatisfied, positive and negative, and the like. Furthermore, the sending of more complex feedback as a channel of direct contact with account administration is here made available. The location of rating metrics may be attached to an interface with the credentials of an agent where and/or when the rating relates to agent performance during a conversation displayed in a chat window.

Figure 2:
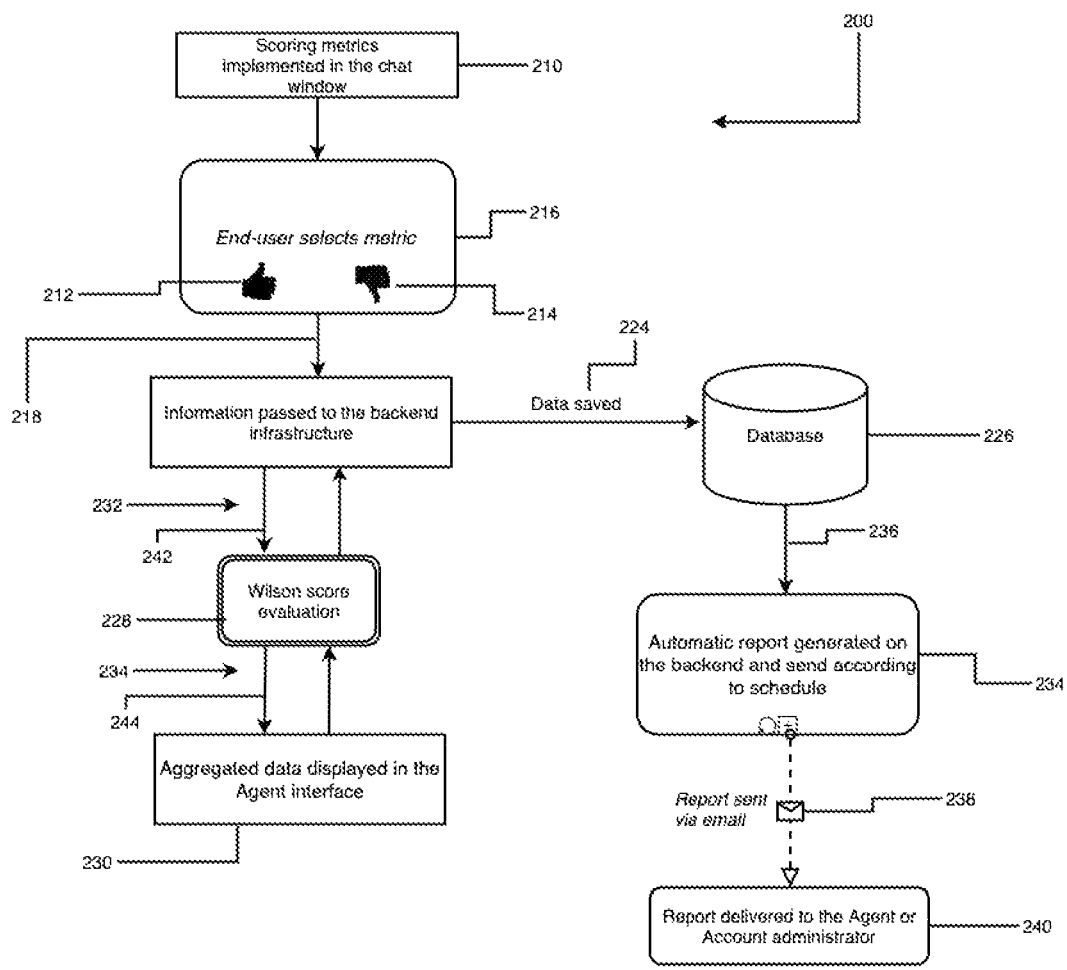
FIG. 2 depicts an information flow overview according to embodiments of the present disclosure.

FIG. 2 depicts an information flow of a localization of an instant messaging window with chat ratings implemented on a web page. The depicted embodiment may be displayed in any location on the webpage and its placement is dependent only on the localization of the instant messaging window itself. Chat assessment from the perspective of the end-user constitutes a one-click action performed only in the chat window, with an example of same presented in FIG. 2. In particular, the information flow of FIG. 2 starts with the implementation of a scoring metric into a chat window 210. Such metric 216 may include a thumbs up 212, indicative of a positive user feedback, and a thumbs down 214, indicative of a negative user feedback. The now enabled user provides feedback by way of manually activating one of the thumbs up or down. Such data is then collected 218. After this initial action is performed by the end-user, the embodiment redirects (220) the collected data to a backend infrastructure 222 which, with the employment of the Wilson Score, analyzes the incoming data. The backend infrastructure may comprise any arrangement and configuration as may be appreciated by the skilled person for performing the herein described functionality in order to generate the herein described results. Assessment performed by the employment of the Wilson Score effectively replaces the current typically used numerical average because now, herein, probability is taken into account. The embodiment uses scoring which bases its effect on how likely it is that service delivered by a particular agent will have a positive effect.

In the flow of information depicted in FIG. 2, data input performed by the end-user via a chat window, is transferred to the backend infrastructure and saved 224 into database 226. The previously mentioned Wilson Score is used (228) to evaluate the result and afterward, the embodiment aggregates data and reanalyzes it upon each new entry (232, 234) from the user interface (data input in the chat window), as well as displays it in the agent interface (230). As further depicted in FIG. 2, the data within database 226 may be used (236) to automatically generate a report, at the backend, and send out the report according to a predetermined and predefined schedule (234). The report may be sent out via e-mail (238) to any number of receivers by means known to the skilled person. Such persons may include the agent at issue as well as an account administer. Other recipients may be included as envisioned by the skilled person.

Implementation of the Wilson Score to the scoring as per the present embodiments addresses one of the most important issues related to the features of performing chat assessment, namely determination of the probability of a positive rating occurrence in the future and with it the likelihood that the agent at issue will repeat a previous performance with a next user. A simple calculation of positive and negative ratings would be incapable of a true presentation of results concerning probability or representation of an agent's potential while the Wilson Score by virtue of its probabilities-based assessment depicts a more accurate picture of an overall performance as well as a more accurate prediction of future performance of and by the agent.

Figure 3:
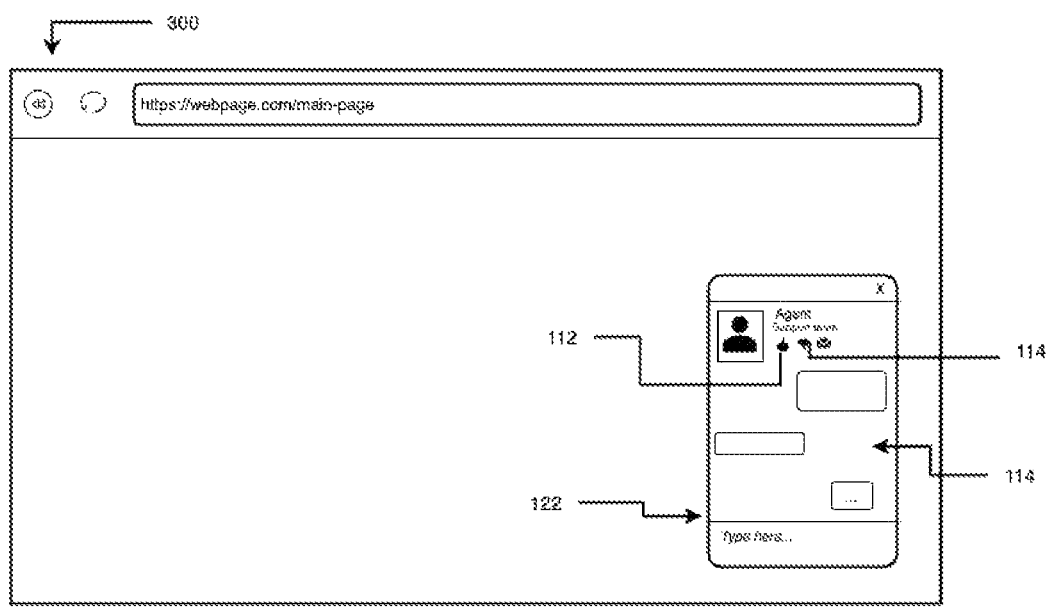
FIG. 3 depicts an example implementation in a chat window.

FIG. 3 depicts an application of embodiments of the present disclosure in a web-based environment 300, namely, inclusion of a functional representation of a smart phone 122, and in particular its user interface 120, upon which a user may manually enter a rating (e.g., thumbs up 112 or thumbs down 114).

Figure 4:
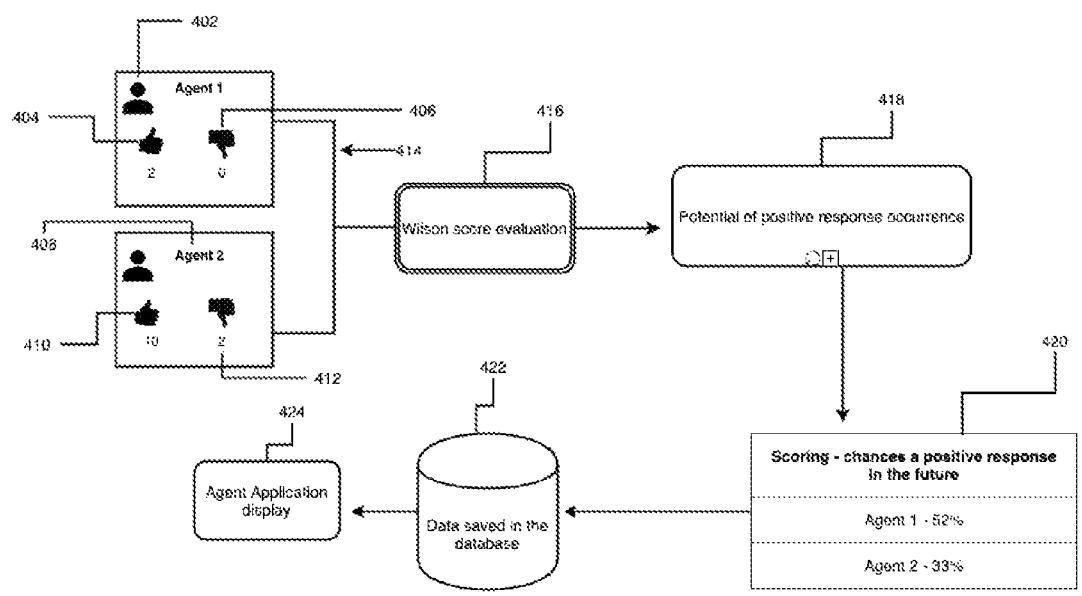
FIG. 4 depicts another information flow overview according to embodiments of the present disclosure.

FIG. 4 depicts how the embodiment handles data scoring and how it implies or affects its evaluation. By way of example, an information flow related to data input collected from the scorings for two agents is depicted. As shown, agent 1 (402) has received two positive ratings 404 (as depicted, two thumbs up) and no negative ratings 406 (as depicted, no thumbs down). By contrast, agent 2 408 has received ten positive ratings (410) and two negative ratings (412). After application of the Wilson Score, agent 2 has receives an over 52% chance of positive ratings in the future even though there were some negative assessments, while agent 1 has received only a 33% chance of receiving a positive rating in the future. This prediction implies a certain confidence level that the effectiveness of agent 2 is higher than agent 1, the effectiveness being directly correlated to the positive ratings. The steps depicted in FIG. 4 are as follows. The ratings regarding the two agents is directed 414 to the Wilson Score evaluation 416 which produces 418 the aforementioned results 420 regarding the confidence level of an agent's effectiveness. The scoring 420 may be saved into an appropriately arranged and configured database 422 and further be subjected to display, such as via an agent's application 424.

The Wilson Score algorithm constitutes a commonly known formula that is widely used in different technological branches and its application to the scoring system of an agent's performance scoring, predictions and/or the like constitutes an innovative usage of the same. For the sake of clarity and by way of explanation, the Wilson Score as used herein makes use of the following mathematic formula:

$$(p+2\times zzfn-Z\times I((zzfn\ In+p\times(1-p)In))I(1+4\times zzfn)$$

where n stands for the number of positive and negative ratings thereby constituting the total number of ratings. p refers to the number of positive ratings divided by n constituting the probability of a positive rating. Lastly, zzfn constitutes a constant value helping to clarify the implemented formula expressed by $Z\times Z/(4\times n)$. The abovementioned mathematic description shall be understood as a simple method implemented according to embodiments of the present disclosure with no attempt to become an element of the exclusive use of the embodiment; namely, it shall be understood as a means to enable legitimate scoring in the embodiment.

After data collected from the user interface 120, the embodiment creates a twofold processing of data presented as depicted in FIG. 2. In particular, a first line (218, 242) directs aggregated data to evaluation by the Wilson Score (228) and further (244) to an agent interface 230 where the data is displayed. Backend infrastructure in the embodiment is responsible for a real-time refreshment of such data upon new entry from the data input (216, see FIG. 1 implemented in the webpage according to the example from FIG. 3). The second dimension of this flow saves data (224) in the database 226 and then facilitates and otherwise enables (236) the automated report generation and sending (234, 238) to the Agent or account administrator (240) with daily, weekly, monthly or any custom time-framed summary of Agents' performance according to scoring rate. Such report sending may be possible thanks to the email account given during chat registration or account setup. The embodiment shall use external sending infrastructure delivering sending servers to send messages to the defined email address given by the account administrator. Display in the agent interface allows for the creation of custom reports which may be presented in the form of different charts according to a particular embodiment and/or user need.

Figure 5:
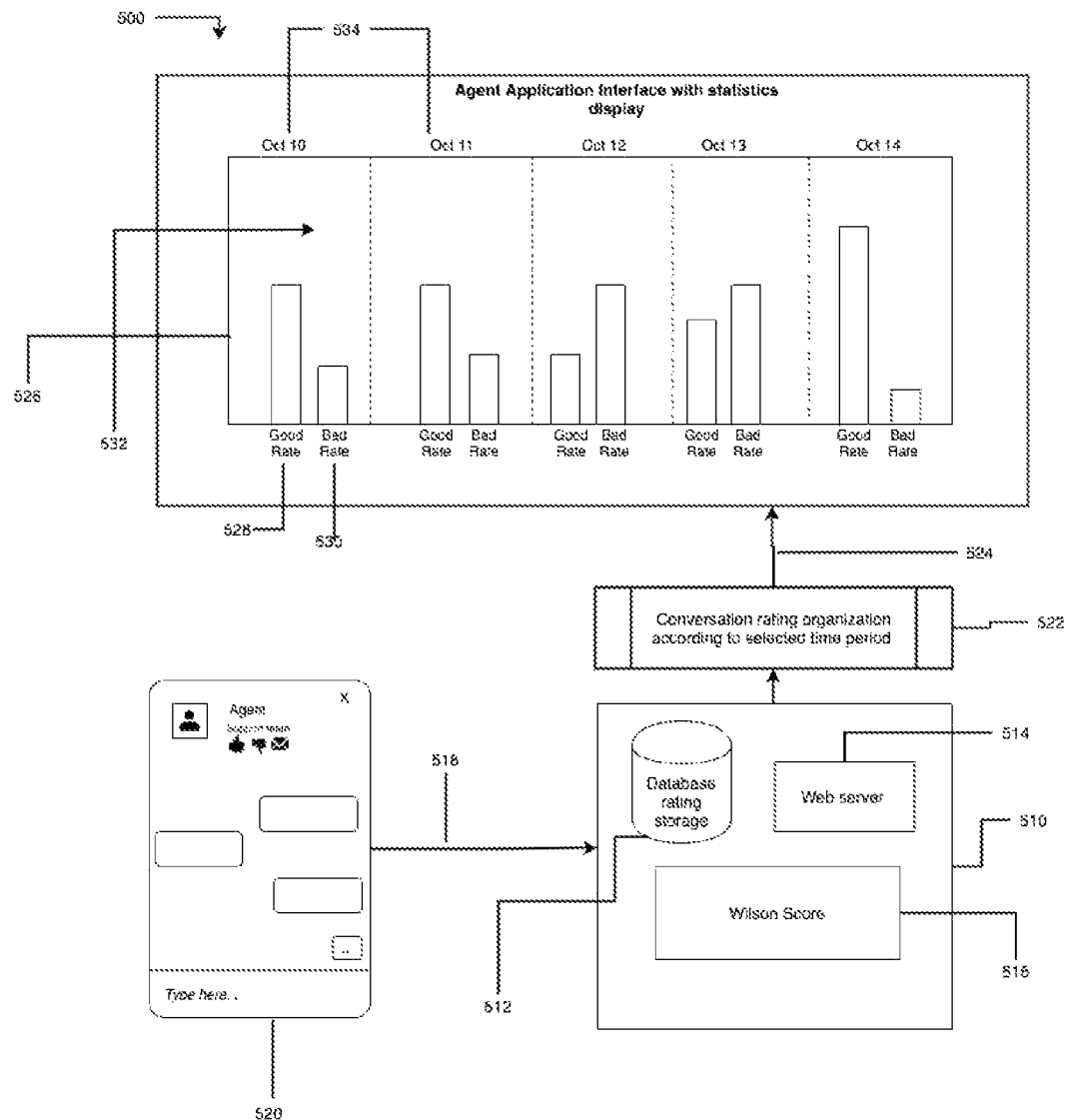
FIG. 5 depicts a system overview according to embodiments of the present disclosure.

FIG. 5 depicts how an agents' performance can be displayed as the output of data collected via an in-chat window implemented ratings arrangement (see e.g., FIG. 1). As depicted in FIG. 5, functional feature 510, the embodiment uses three elements of the infrastructure to support functional data flow, namely: a database 512 wherein results of ratings determinations may be stored, a web server 514 configured and arranged to be responsible to upheld communication between infrastructure elements, and a Wilson Score 516 responsible for addressing data collected by input evaluation as detailed herein. As further depicted in FIG. 5, ratings data manually generated by a user on a user interface may be fed 518 into the functional feature 510 via a user device 520. The reports generated by the functional feature 510 may be communicated to select receivers over a period of time 522, the aforementioned being pre-determined or selectively determined upon set up, for display (524) at the receiver(s). An example of such a display (526) broken down by good (528) and bad (530) ratings, represented by way of bar charts (532), and separated by days (534), is depicted in FIG. 5.

Figure 6:
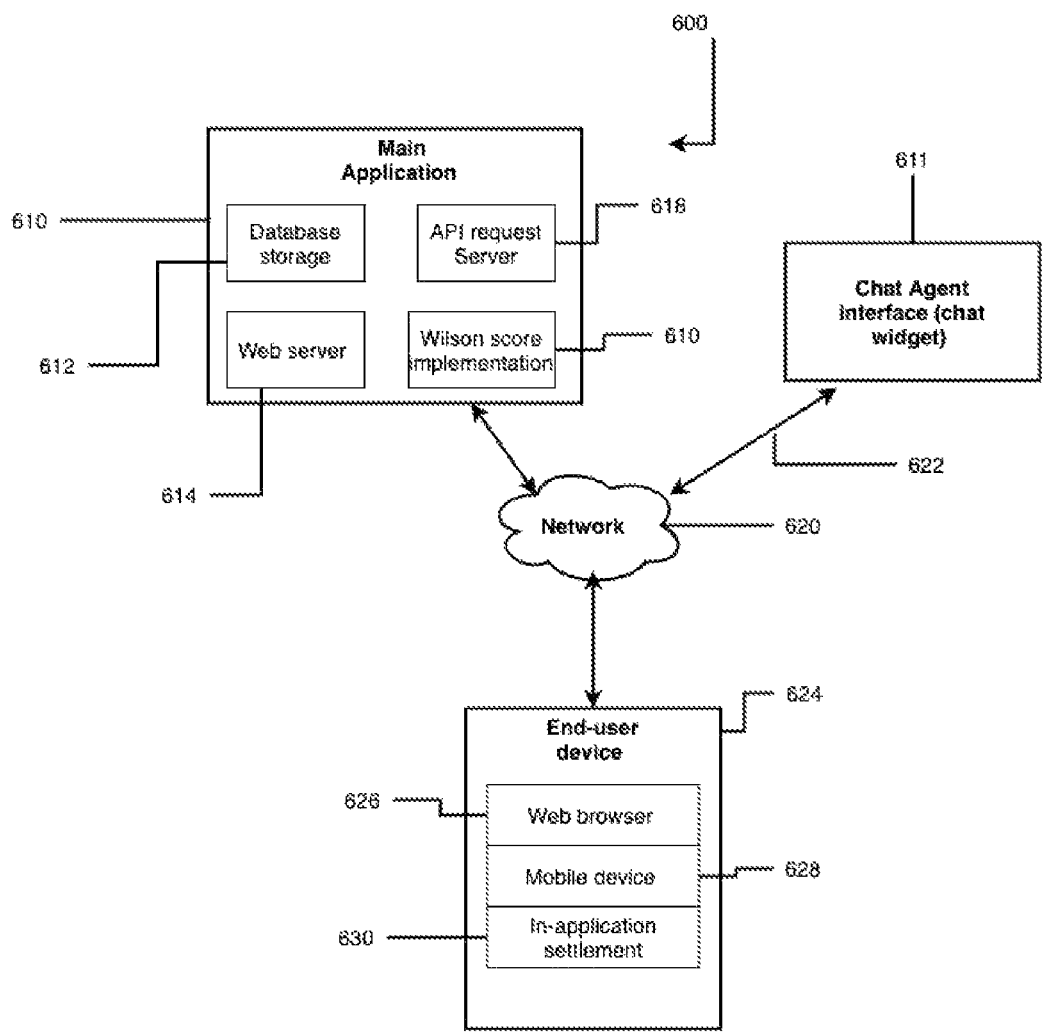
FIG. 6 depicts a networked relationship between particular elements of the embodiments of the present disclosure.

The same aspect of the flow is presented in FIG. 6, wherein main application 610 constitutes an overlap with what is presented by FIG. 5, functional feature 510. As depicted in FIG. 6, the embodiment uses network 620 to communicate with and between the infrastructure of the embodiment responsible for scoring calculation located in the main application (610) composed out of a database 612 for storage, a Web Server 614, Wilson Score implemented mechanism 616 and API request server 618. The API request server enables communication between the embodiment and other external systems, thereby facilitating and otherwise enabling API integration solutions. This arrangement makes the embodiment more flexible and allows implementation with different chat providers or other real-time messaging systems.

FIG. 6 presents how the embodiment interacts with the network. It depicts that the flow of information based on a real-time network connection which refreshes each time there is a new data input from the chat widget (611). An end user device 624 is depicted, networked (620) with the other elements and features of FIG. 6. The end user device 624 may comprise a web browser 626, mobile device 628 and/or in-application settlement 630 and is otherwise configured to provide the user with a displayed user interface. Whole logic responsible for data processing is managed on the side of the main or web application (610) implemented to the real-time messaging application. Both data input (element 611) and data processing core (main application 610) communicate with each other via network 620. This integration allows for collecting data in a reliable way as the direct API integration shall report data in a regressive way as well. This way of integrating the embodiment into real-time messaging systems has a big advantage over webhooks based solutions which may result in data loss in case of application downtime or multiple requests at the same time. The embodiment based on API integration shall provide strong stability and easier maintenance after implementation.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for scoring user sentiment relating to a user online chat experience with an agent, the method comprising the steps of:
   providing at least two widgets on a user interface arranged in a front end in communication with a backend, the at least two widgets configured to receive manual input from the user and generate sentiment data in response to the manual input;
   receiving at the backend the sentiment data generated by user manual activation of at least one of the at least two widgets;
   applying a Wilson Score evaluation to received sentiment data so as to generate confidence level scores data predicting a number and type of sentiment data; and
   aggregating the confidence level scores data;
   evaluating online chat experience with an agent;
   wherein a first of the at least two widgets is configured to represent a positive user sentiment and a second of the at least two widgets is configured to represent a negative user sentiment, and
   wherein at least the front end and backend communicate via integrated API requests.

2. The method according to claim 1, wherein the front end and back end communicate in real time or with a small delay dependent on infrastructural efficiency.

3. The method according to claim 2, wherein the step of aggregating further comprises the step of aggregating the confidence level scores data by agent.

4. The method according to claim 3, further comprising the steps of:
   saving the confidence level scores data in a database;
   transmitting the confidence level scores data to preselected receivers; and
   displaying the confidence level scores data at the receivers.

5. The method according to claim 4, wherein the receivers comprise at least one of agents, users and account administrators tasked with facilitating the online chat experience.

6. The method according to claim 5, wherein the first widget comprises a graphical representation of a thumbs up and the second widget comprises a graphical representation of a thumbs down.

7. The method according to claim 6, wherein the step of displaying further comprises the steps of sorting the confidence level scores data by at least one of date and sentiment.

8. A method according to claim 1, wherein the evaluating online chat experience with an agent further comprising the steps of:
   receiving the sentiment data generated by user manual action;

analyzing sentiment based on data averaged by the algorithm including Wilson Score;

predicting the potential result of sentiment for the incoming future data;

displaying the result to the second user of the invention on the second user processor; and wherein the potential result prediction is based on the analysis of the data analysis based on data averaged by the algorithm including Wilson Score.

9. A system for scoring user sentiment relating to a user online chat experience with an agent, the system comprising:

at least two widgets arranged on a user interface, the user interface arranged in a front end in communication with a backend and comprising API, and the at least two widgets configured to receive manual input from the user and generate sentiment data in response to the manual input;

a main application arranged in the backend and configured to receive and aggregate the sentiment data generated by user manual activation of at least one of the at least two widgets, the main application comprising an API request server configured to enable communication with the backend and Wilson Score element configured to receive the sentiment data and perform a Wilson Score thereon so as to generate confidence level scores data predicting a number and type of sentiment data; and an aggregating element arranged and configured to aggregate the confidence level scores data; and wherein a first of the at least two widgets is configured to represent a positive user sentiment and a second of the at least two widgets is configured to represent a negative user sentiment, and wherein at least the front end and backend communicate via integrated API requests.

10. The system according to claim 9, wherein the front end and the main application communicate in real time or with a small delay dependent on infrastructural efficiency.

11. The system according to claim 10, wherein the main application is further configured to aggregate the confidence level scores data by agent.

12. The system according to claim 11, wherein the main application further comprises:

a database configured and arranged for saving the confidence level scores therein; and a communication element configured and arranged to transmit the confidence level scores data to preselected receivers.

13. The system according to claim 12, wherein the receivers comprise at least one of agents, users and account administrators tasked with facilitating the online chat experience.

14. The system according to claim 13, wherein the first widget comprises a graphical representation of a thumbs up and the second widget comprises a graphical representation of a thumbs down.

15. The system according to claim 14, wherein the main application is further configured to sort the confidence level scores data by at least one of date and sentiment.

* * * * *